(12) United States Patent
Ruan

(10) Patent No.: US 10,996,907 B2
(45) Date of Patent: May 4, 2021

(54) TERMINAL DEVICE AND NON-TRANSITORY COMPUTER-READABLE MEDIUM STORING COMPUTER-READABLE INSTRUCTIONS FOR TERMINAL DEVICE

(71) Applicant: BROTHER KOGYO KABUSHIKI KAISHA, Nagoya (JP)

(72) Inventor: Longlong Ruan, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/295,069

(22) Filed: Mar. 7, 2019

(65) Prior Publication Data

US 2019/0303069 A1 Oct. 3, 2019

(30) Foreign Application Priority Data

Mar. 29, 2018 (JP) .............................. JP2018-065329

(51) Int. Cl.
*G06F 3/12* (2006.01)
*H04M 1/725* (2021.01)

(52) U.S. Cl.
CPC .......... *G06F 3/1236* (2013.01); *G06F 3/1204* (2013.01); *G06F 3/1292* (2013.01); *H04M 1/7253* (2013.01); *H04M 1/72533* (2013.01)

(58) Field of Classification Search
CPC .... G06F 3/1236; G06F 3/1204; G06F 3/1292; G06F 3/04886; G06F 3/041;

(Continued)

(56) References Cited

U.S. PATENT DOCUMENTS

2009/0066998 A1* 3/2009 Kato ..................... G01C 21/26
358/1.15
2011/0292445 A1* 12/2011 Kato .................. H04N 1/00222
358/1.15

(Continued)

FOREIGN PATENT DOCUMENTS

JP 2013-214804 A 10/2013

OTHER PUBLICATIONS

Wi-Fi Alliance, "Wi-Fi Peer-to-Peer (P2P) Technical Specification version 1.5", Aug. 4, 2014 (Aug. 4, 2014), pp. 1-183, Retrieved from the Internet <URL:https://www.wi-fi.org/downloads-registered/Wi-Fi_P2P_Technical_Specification_v1.5.pdf> [retrieved on Dec. 9, 2015].

*Primary Examiner* — Iriana Cruz
(74) *Attorney, Agent, or Firm* — Scully Scott Murphy and Presser

(57) ABSTRACT

A terminal device may supply a communication executing instruction to an OS program. The OS program may supply a signal sending instruction to a first wireless interface in response to obtaining the communication executing instruction, and the first wireless interface may start sending a polling signal in response to obtaining the signal sending instruction and establishes a first wireless connection with the communication device. The first wireless connection may be for causing the communication device to execute a specific process. After the first wireless connection has been established with the communication device, the terminal device may determine whether a predetermined condition is fulfilled; and in a case where it is determined that the predetermined condition is not fulfilled, may supply the communication executing instruction to the OS program without the specific instruction being inputted.

16 Claims, 7 Drawing Sheets

(58) Field of Classification Search
CPC .............. G06F 3/0414; H04M 1/7253; H04M
1/72533; H04M 2250/04; H04M 2250/06;
H04N 1/00307; H04N 1/00474; H04N
1/00392; H04N 1/32767; H04N 1/00477;
H04N 1/00411; H04N 1/00384; H04N
2201/0094; H04N 2201/006; H04N
2201/0036; H04N 2201/0039
See application file for complete search history.

(56) References Cited

U.S. PATENT DOCUMENTS

| | | | |
|---|---|---|---|
| 2013/0229690 A1* | 9/2013 | Sumita | H04N 1/00408 358/1.15 |
| 2013/0260683 A1* | 10/2013 | Suzuki | G06F 3/1236 455/41.1 |
| 2015/0240531 A1* | 8/2015 | Blust | E05B 65/46 340/5.5 |
| 2015/0304805 A1 | 10/2015 | Suzuki et al. | |
| 2017/0201650 A1* | 7/2017 | Mikami | H04N 1/00315 |
| 2017/0208431 A1 | 7/2017 | Suzuki et al. | |

* cited by examiner

TERMINAL DEVICE AND NON-TRANSITORY COMPUTER-READABLE MEDIUM STORING COMPUTER-READABLE INSTRUCTIONS FOR TERMINAL DEVICE

CROSS-REFERENCE TO RELATED APPLICATION

This application claims priority to Japanese Patent Application No. 2018-65329 filed on Mar. 29, 2018, the contents of which are hereby incorporated by reference into the present application.

TECHNICAL FIELD

The disclosure herein discloses a technique related to a terminal device configured to cause a communication device to execute a specific process.

DESCRIPTION OF RELATED ART

A technique is known in which a user performs an operation for printing on a portable terminal to cause the portable terminal to generate a printing instruction and to further cause a Near Field Communication (NFC) connection to be established between the portable terminal and a multifunction peripheral (MFP). In this case, the portable terminal uses the NFC connection to send the generated printing instruction to the MFP. Here, in a case where the MFP is in a state incapable of receiving print data, the portable terminal receives communication NG information from the MFP. When receiving the communication NG information, the portable terminal notifies the user that the print data cannot be sent.

SUMMARY

In the above technique, when the MFP returns to a state capable of receiving print data after the terminal device has received the communication NG information, the user needs to perform the operation for printing (that is, the operation to cause the terminal device to generate the printing instruction) on the terminal device again.

The disclosure herein provides a technique that improves user's convenience.

A non-transitory computer-readable medium storing computer-readable instructions for a terminal device is disclosed herein. The computer-readable instructions, when executed by a processor of the terminal device, may cause the terminal device to: in a case where a specific instruction for causing the terminal device to communicate with a communication device is inputted by a user, supply a communication executing instruction to an operating system (OS) program of the terminal device, the communication executing instruction being for instructing to execute communication via a first wireless interface of the terminal device, wherein the OS program supplies a signal sending instruction to the first wireless interface in response to obtaining the communication executing instruction, the first wireless interface starts sending a polling signal in response to obtaining the signal sending instruction, and establishes a first wireless connection with the communication device in response to the polling signal being received by the communication device, and the first wireless connection is for causing the communication device to execute a specific process; after the first wireless connection has been established with the communication device, determine whether a predetermined condition related to the specific process is fulfilled, in a case where it is determined that the predetermined condition is not fulfilled, supply the communication executing instruction to the OS program without the specific instruction being inputted by the user, wherein in a case where it is determined that the predetermined condition is fulfilled, the communication executing instruction is not supplied to the OS program.

The above terminal device itself and a method performed by the terminal device are also novel and useful.

EMBODIMENTS

Figure 1:
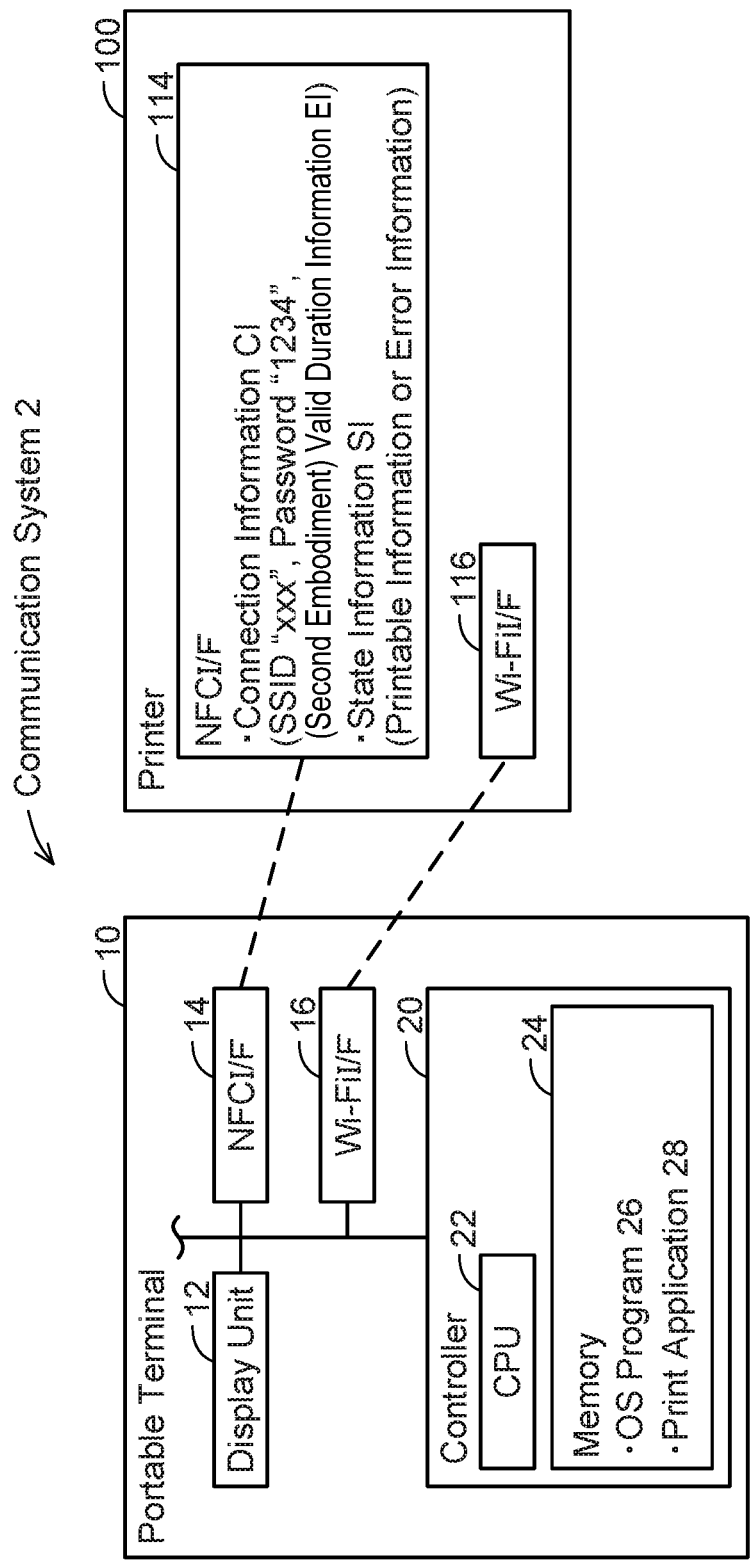
FIG. 1 shows a configuration of a communication system.

First Embodiment (Configuration of Communication System 2; FIG. 1) As shown in FIG. 1, a communication system 2 includes a portable terminal 10 and a printer 100. Each of the devices 10, 100 is configured to execute wireless communication according to a Near Field Communication (NFC) scheme (that is, a kind of near-range wireless communication) and wireless communication according to a Wi-Fi scheme.

(Configuration of Printer 100)

The printer 100 is a peripheral (that is, a peripheral of the portable terminal 10) capable of executing a printing function. The printer 100 includes an NFC interface 114 and a Wi-Fi interface 116. Hereinbelow, an interface may be denoted "I/F".

The Wi-Fi I/F 116 is an I/F configured to execute wireless communication according to the Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, etc.). The Wi-Fi I/F 116 especially supports a Wi-Fi Direct (registered trademark; WFD) scheme established by the Wi-Fi Alliance. The WFD scheme is a wireless communication scheme described in the standard "Wi-Fi Peer-to-Peer (P2P) Technical Specification Version 1.1" published by the Wi-Fi Alliance.

The printer 100 is configured to operate in one of a Group Owner (G/O) state, a Client (CL) state, and a device state of the WFD scheme. The printer 100 can operate as a G/O of the WFD scheme and create a Wi-Fi network to which the printer 100 and an external terminal (such as the portable terminal 10) belong. In this case, the printer 100 can cause the external device to participate in the Wi-Fi network as a child station. In a variant, the printer 100 may operate as a SoftAP instead of the G/O of the WFD scheme and create a network to which the printer 100 and an external device belong.

The NFC I/F 114 is a wireless I/F for executing wireless communication according to the NFC scheme. The NFC scheme is a wireless communication scheme based on, for example, the international standard ISO/IEC 21481 or 18092. The NFC I/F 114 is an NFC forum tag that functions as an Integrated Circuit (IC) tag according to the NFC scheme. In a case of receiving a polling signal from an external device (such as the portable terminal 10), the NFC I/F 114 sends a response signal for the polling signal to the external device and establishes an NFC connection with the external device.

The NFC I/F 114 stores connection information CI and state information SI. The connection information CI is information for causing an external device to participate in the Wi-Fi network in which the printer 100 operates as a parent station, and includes a Service Set Identifier (SSID) "xxx" for identifying the Wi-Fi network and a password "1234". The connection information CI is generated by the printer 100 upon when the printer 100 shifts to the Group Owner (G/O) state and is stored in the NFC I/F 114.

The state information SI is one of print-capable information and error information. The print-capable information indicates that the printer 100 is currently capable of executing a print process. On the other hand, the error information indicates that the printer 100 is currently incapable of executing the print process. Especially, the error information includes information indicating a cause by which the execution of the print process has become incapable (such as paper jam, insufficient remaining amount of ink, etc.). The state information SI is generated by the printer 100 upon when the printer 100 shifts from a state capable of executing the print process (or a state incapable of executing the print process) to the state incapable of executing the print process (or the state capable of executing the print process), and is stored in the NFC I/F 114.

Here, differences between the Wi-Fi I/F and the NFC I/F will be described. A communication speed of wireless communication executed via the Wi-Fi I/F (a maximum communication speed of 11 to 600 Mbps, for example) is faster than a communication speed of wireless communication executed via the NFC I/F (a maximum communication speed of 100 to 424 Kbps, for example). Further, a frequency used in wireless communication executed via the Wi-Fi I/F (2.4 GHz band or 5.0 GHz band, for example) is different from a frequency used in wireless communication executed via the NFC I/F (13.56 MHz band, for example). Further, a maximum distance with which wireless communication can be executed via the Wi-Fi I/F (about 100 m at maximum, for example) is greater than a maximum distance with which wireless communication can be executed via the NFC I/F (about 10 cm at maximum, for example).

(Configuration of Portable Terminal 10)

The portable terminal 10 is a mobile terminal such as a cellphone, a smartphone, and a tablet PC. The portable terminal 10 includes a display unit 12, an NFC I/F 14, a Wi-Fi I/F 16, and a controller 20. Each of the units 12 to 20 is connected to a bus line (to which a reference sign is not given).

The display unit 12 is a display for displaying various types of information. The display unit 12 functions as a so-called touch panel. That is, the display unit 12 functions also as an operation unit to be operated by a user.

The NFC I/F 14 is similar to the NFC I/F 114 of the printer 100 except for being an NFC forum device instead of the NFC forum tag. The NFC forum device is an I/F configured to selectively operate in one of a Peer to Peer (P2P) mode, a Reader/Writer (R/W) mode, and a Card Emulation (CE) mode. The NFC I/F 14 is configured to operate at least in the R/W mode. In a case of operating in a Reader mode, the NFC I/F 14 can read data from the NFC I/F 114 of the printer 100, that is, receive data from the NFC I/F 114. Further, in a case of operating in a Writer mode, the NFC I/F 14 can write data in the NFC I/F 114, that is, transmit data to the NFC I/F 114.

The Wi-Fi I/F 16 is similar to the Wi-Fi I/F 116 of the printer 100 except for not supporting the WFD scheme. The Wi-Fi I/F 16 is configured to establish a wireless connection with the Wi-Fi I/F 116 of the printer 100 to participate in the Wi-Fi network, as a child station (a so-called legacy), in which the printer 100 operates as the parent station.

The controller 20 includes a CPU 22 and a memory 24. The CPU 22 is configured to execute various processes according to programs 26, 28 stored in the memory 24. The memory 24 is constituted of a volatile memory, a nonvolatile memory and the like. The memory 24 stores an Operating System (OS) program 26 for implementing basic processes, and a print application program (hereinbelow termed "print app") 28. In this embodiment, a situation is assumed in which the OS program 26 is iOS (registered trademark).

The print app 28 is a program provided by a vendor of the printer 100, and is a program for sending a print execution request for requesting execution of the print process to the printer 100. The print app 28 may be installed in the portable terminal 10 from a server (not shown) provided by the vendor on the Internet, or may be installed in the terminal device 10 from a medium shipped with the printer 100, for example.

Figure 2:
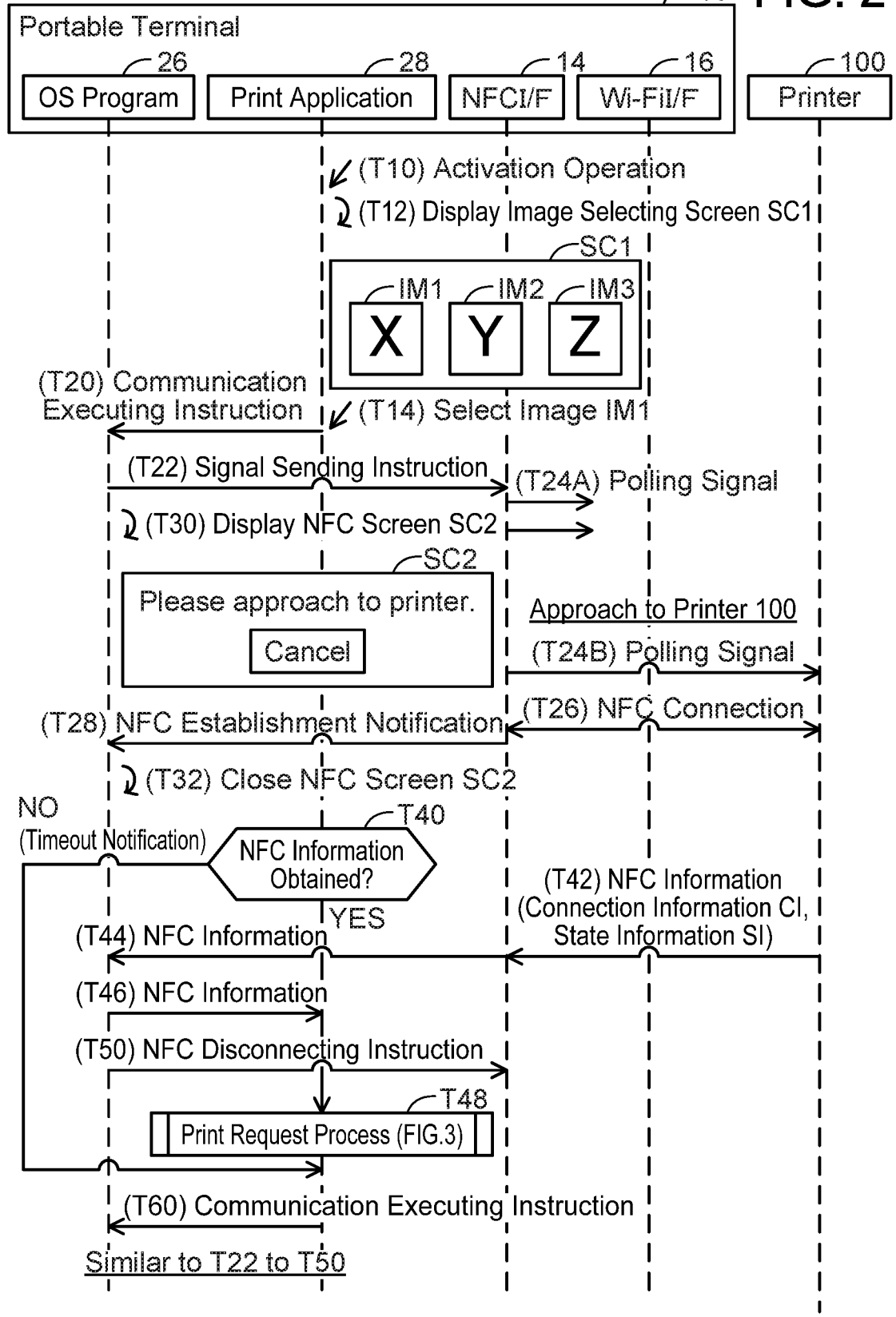
FIG. 2 shows a sequence diagram of a process for causing a printer to execute printing.

(Process for Causing Printer to Execute Printing; FIG. 2)

A process through which the portable terminal 10 causes the printer 100 to execute the print process will be described with reference to FIG. 2. Hereinbelow, for easier understanding, processes which the CPU 22 of the portable terminal 10 executes in accordance with the OS program 26 may not be described with the CPU 22 as the subject of action, but with the OS program 26 as the subject of action. Further, similarly, processes which the CPU 22 executes in accordance with the print app 28 may be described with the print app 28 as the subject of action. Hereinbelow, the OS program 26 and the print app 28 will respectively be termed "OS 26" and "app 28".

In T10, an operation to activate the app 28 is performed on the portable terminal 10 by a user, as a result of which the app 28 is activated.

In T12, the app 28 causes the display unit 12 to display an image selecting screen SC1. The image selecting screen SC1 is a screen for selecting an image to be printed by the printer 100. As shown in FIG. 2, the image selecting screen SC1 includes plural images IM1 to IM3 represented by a plurality of image information stored in the memory 24 of the portable terminal 10. In this embodiment, the user inputs a selecting instruction of selecting the image IM1 from among the plural images IM1 to IM3 in T14. Further, the app 28 causes the display unit 12 to display a setting screen (not shown) for inputting setting information (such as paper size and color/monochrome) for execution of the print process. The user inputs setting information to the setting screen.

In a case where the inputs of the selecting instruction and the setting information are performed by the user in T14, the app 28 supplies a communication executing instruction to the OS 26 in T20. The communication executing instruction is a command for instructing the OS 26 to send a polling signal through the NFC I/F 14.

When obtaining the communication executing instruction from the app 28 in T20, the OS 26 supplies a signal sending instruction to the NFC I/F 14 in T22. The signal sending instruction is a command for instructing the NFC I/F 14 to send a polling signal.

Further, when obtaining the communication executing instruction from the app 28 in T20, the OS 26 causes the display unit 12 to display an NFC screen SC2 in T30. The NFC screen SC2 is a screen indicating that communication via the NFC I/F 14 is executable, and specifically, it includes a message prompting the user to bring the portable terminal 10 close to the printer 100.

When the NFC I/F 14 obtains the signal sending instruction from the OS 26 in T22, it starts sending a polling signal in T24A. The user sees the NFC screen SC2 displayed in the portable terminal 10 and brings the portable terminal 10 close to the printer 100. Due to this, in T24B, a distance between the NFC I/F 14 and the NFC I/F 114 of the printer 100 becomes a predetermined distance (such as 10 cm) or less, and thus the polling signal is received by the printer 100.

In T26, the NFC I/F 14 receives a response signal to the polling signal from the NFC I/F 114 of the printer 100 and establishes an NFC connection with the printer 100. In T28, the NFC I/F 14 supplies to the OS 26 an NFC establishment notification indicating that the NFC connection has been established. Here, when the OS 26 obtains the NFC establishment notification from the NFC I/F 14 in T28, it closes the NFC screen SC2 (that is, terminates the display thereof) in T32. Further, when the OS 26 obtains the NFC establishment notification from the NFC I/F 14 (that is, upon when the NFC screen SC2 is closed), it instructs the NFC I/F 14 to stop sending a polling signal. Due to this, the NFC I/F 14 stops sending a polling signal. That is, a polling signal is sent during when the NFC screen SC2 is displayed on the display unit 12.

When the NFC connection is established in T26, the NFC I/F 14 operates in the Reader mode and reads (that is, receives) NFC information including the connection information CI and the state information SI from the NFC I/F 114 of the printer 100 in T42. In this case, the NFC I/F 14 supplies the received NFC information to the OS 26 in T44. As a result, the OS 26 supplies the obtained NFC information to the app 28 in T46. When the OS 26 supplies the NFC information to the app 28, it further supplies an NFC disconnecting instruction to the NFC I/F 14 (T50). The NFC disconnecting instruction is a command for instructing the NFC I/F 14 to disconnect the NFC connection. Due to this, the NFC I/F 14 disconnects the NFC connection established in T26.

FIG. 2 shows a case in which the NFC I/F 14 receives the NFC information from the printer 100. However, some sort of incident may occur by which the NFC I/F 14 cannot receive the NFC information from the printer 100. The above incident may include that the NFC connection between the NFC I/F 14 and the NFC I/F 114 is disconnected due to the portable terminal 10 being moved away from the printer 100 after the NFC I/F 14 has established the NFC connection but before the NFC information is received. In this case, the OS 26 cannot obtain the NFC information from the NFC I/F 14. In a case where the OS 26 cannot obtain the NFC information before a predetermined time elapses since it obtained the NFC establishment notification in T28, the OS 26 supplies a timeout notification to the app 28.

Further, when the app 28 supplies the communication executing instruction to the OS 26 in T20, it determines in T40 whether or not the NFC information is obtained from the OS 26. In a case where the NFC information is obtained from the OS 26, that is, in a case where the process of T46 is executed, the app 28 determines YES in T40 and executes a print request process of T48 (see FIG. 3).

On the other hand, in a case where the timeout notification is obtained from the OS 26, the app 28 determines NO in T40 and supplies the communication executing instruction to the OS 26 again in T60. Due to this, processes similar to T22 to T50 are executed, and the printer 100 can be caused to execute the print process in the print request process of T48 (see FIG. 3).

FIG. 2 shows a case in which the portable terminal 10 is brought close to the printer 100 and the NFC connection is thereby established. However, an incident may occur by which the portable terminal 10 cannot be brought close to the printer 100 and the NFC connection is thereby not established. In this case, the OS 26 does not obtain the NFC establishment notification from the NFC I/F 14 after having supplied the signal sending instruction to the NFC I/F 14. In a case where the OS 26 does not obtain the NFC establishment notification even when a predetermined time has elapsed since it supplied the signal sending instruction, the OS 26 supplies to the app 28 an establishment error notification indicating that the NFC connection was not established. In this case, the app 28 terminates the process of FIG. 2 without supplying the communication executing instruction to the OS 26. Further, the OS 26 closes the NFC screen SC2 as in T32 in the case where it does not obtain the NFC establishment notification even when the predetermined time has elapsed since it supplied the signal sending instruction.

Figure 3:
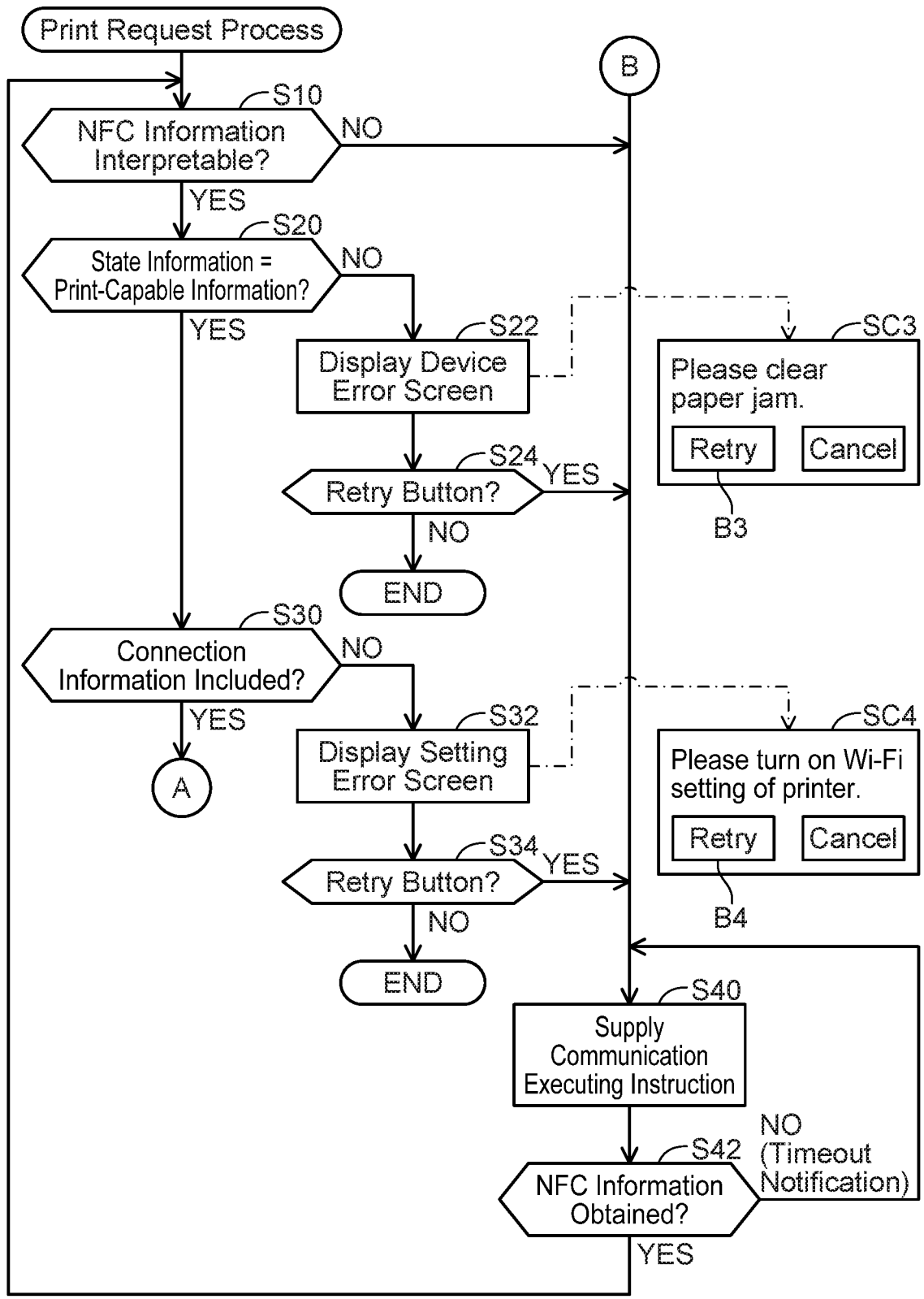
FIG. 3 shows a flowchart of a print request process.
Figure 4:
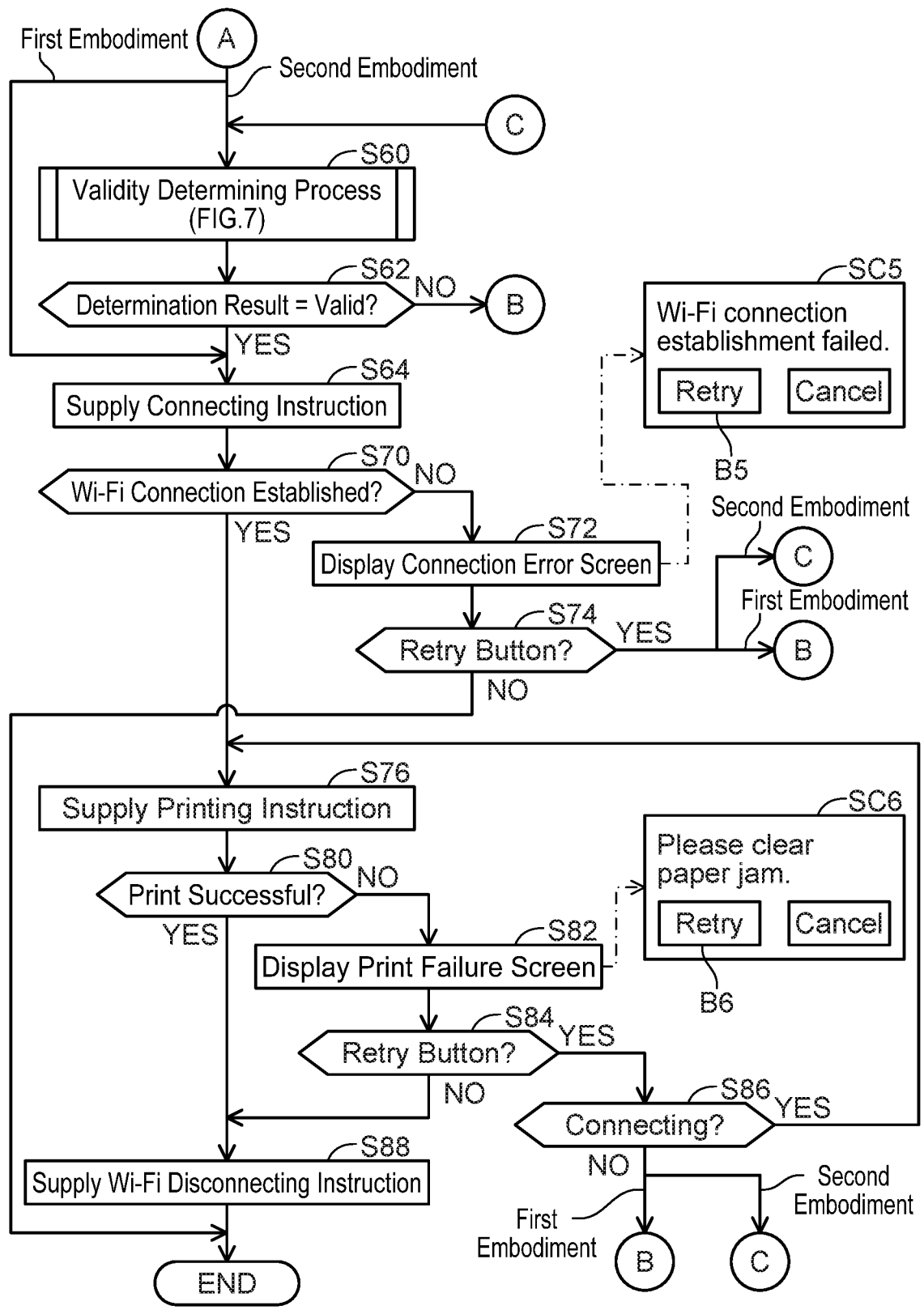
FIG. 4 shows a flowchart continued from FIG. 3.

(Print Request Process; FIGS. 3 and 4)

The print request process which the CPU 22 of the portable terminal 10 executes according to the app 28 will be described with reference to FIGS. 3 and 4.

In S10, the app 28 determines whether or not the NFC information received from the printer 100 is interpretable. If a specification of the printer 100 (in other words, a model of the printer 100) is not compatible with the print app 28, the NFC information may include information which the print app 28 is incapable of interpreting. In a case where the NFC information includes uninterpretable information, the app 28 determines that the NFC information is uninterpretable (NO in S10) and proceeds to S40.

In S40, the app 28 supplies the communication executing instruction to the OS 26 again similarly to T20 of FIG. 2. Due to this, an NFC connection with another printer having a specification compatible with the print app 28 can be established.

S42 is similar to T40 of FIG. 2. In a case of determining YES in S42, the app 28 returns to S10. On the other hand, in a case of determining NO in S42 due to obtaining the timeout notification from the OS 26, the app 28 returns to S40.

Further, in a case of determining that the NFC information is interpretable (YES in S10), the app 28 determines in S20 whether or not the state information SI included in the NFC information is the print-capable information. In a case of determining that the state information SI is not the print-capable information but is the error information (NO in S20), the app 28 proceeds to S22.

In S22, the app 28 displays a device error screen SC3 on the display unit 12. The device error screen SC3 includes a message that prompts the user to resolve an error indicated by the error information, a Retry button B3, and a Cancel button.

In S24, the app 28 determines whether or not the Retry button B3 in the device error screen SC3 is selected by the user. In a case of determining that the Retry button B3 is selected (YES in S24), the app 28 proceeds to S40. Due to this, an NFC connection with the printer 100 can be re-established after the error in the printer 100 has been resolved. On the other hand, in a case of determining that the Cancel button in the device error screen SC3 is selected (NO in S24), the app 28 terminates the print request process.

Further, in a case of determining that the state information SI is the print-capable information (YES in S20), the app 28 determines in S30 whether or not the NFC information received from the printer 100 includes the connection information CI. For example, in a case where the printer 100 is not operating in the G/O state, the connection information CI is not stored in the NFC I/F 114 of the printer 100, as a result of which the NFC information does not include the connection information CI. In a case of determining that the NFC information does not include the connection information CI (NO in S30), the app 28 proceeds to S32.

In S32, the app 28 displays a setting error screen SC4 on the display unit 12. The setting error screen SC4 includes a message that prompts the user to perform an operation to shift the printer 100 to the G/O state, a Retry button B4, and a Cancel button.

In S34, the app 28 determines whether or not the Retry button B4 in the setting error screen SC4 is selected by the user. In a case of determining that the Retry button B4 is selected (YES in S34), the app 28 proceeds to S40. Due to this, an NFC connection with the printer 100 can be re-established after the printer 100 has shifted to the G/O state. On the other hand, in a case of determining that the Cancel button in the setting error screen SC4 is selected (NO in S34), the app 28 terminates the print request process.

Further, in a case of determining that the NFC information includes the connection information CI (YES in S30), the app 28 supplies a connecting instruction including the connection information CI to the OS 26 in S64 of FIG. 4. The connecting instruction is a command for instructing the OS 26 to establish a wireless connection via the Wi-Fi I/F 16 (hereinbelow termed "Wi-Fi connection"). In response to obtaining the connecting instruction, the OS 26 supplies a Wi-Fi instruction including the connection information CI to the Wi-Fi I/F 16. The Wi-Fi instruction is a command for instructing the Wi-Fi I/F 16 to establish the Wi-Fi connection. When obtaining the Wi-Fi instruction from the OS 26, the Wi-Fi I/F 16 executes communication of various signals (such as an Authentication signal, an Association signal, 4-way handshake, etc.) for establishing the Wi-Fi connection with the printer 100. In the course of the communication of the various signals, the password in the connection information CI is sent to the printer 100 and authentication of the password is executed by the printer 100. Due to this, the OS 26 establishes the Wi-Fi connection with the printer 100 via the Wi-Fi I/F 16. As a result, the portable terminal 10 participates as a child station (that is, a legacy) in the Wi-Fi network in which the printer 100 operates as the parent station (that is, as the G/O).

In S70, the app 28 determines whether or not the Wi-Fi connection has been established with the printer 100. Specifically, after the Wi-Fi instruction is supplied, the app 28 obtains a notification indicating a result on whether or not the Wi-Fi connection has been established from the Wi-Fi I/F 16 through the OS 26. In a case of obtaining a connection notification indicating that the Wi-Fi connection has been established as the notification, the app 28 determines that the Wi-Fi connection has been established (YES in S70). On the other hand, in a case of obtaining an error notification indicating that the Wi-Fi connection was not established as the notification, the app 28 determines that the Wi-Fi connection was not established (NO in S70). For example, the Wi-Fi connection is not established when a power of the printer 100 is turned off during the communication of the various signals.

In the case of determining that the Wi-Fi connection was not established with the printer 100 (NO in S70), the app 28 displays a connection error screen SC5 on the display unit 12 in S72. The connection error screen SC5 includes a message indicating that the Wi-Fi connection was not established, a Retry button B5, and a Cancel button.

In S74, the app 28 determines whether or not the Retry button B5 in the connection error screen SC5 is selected by the user. In a case of determining that the Retry button B5 is selected (YES in S74), the app 28 proceeds to S40 of FIG. 3. Due to this, an NFC connection with the printer 100 can be re-established after the cause by which the Wi-Fi connection could not be established has been resolved (such as, after the power of the printer 100 has been turned on). On the other hand, in a case of determining that the Cancel button in the connection error screen SC5 is selected (NO in S74), the app 28 terminates the print request process.

Further, in the case of determining that the Wi-Fi connection has been established with the printer 100 (YES in S70), the app 28 supplies a printing instruction to the OS 26 in S76. The printing instruction is a command for instructing the OS 26 to send a print execution request for causing the printer 100 to execute the print process. The printing instruction includes image data representing the image IM1 selected in T14 of FIG. 2. In response to obtaining the printing instruction from the app 28, the OS 26 sends a print execution request including the image data in the printing instruction to the printer 100 via the Wi-Fi I/F 16 by using the Wi-Fi connection established in S70. Due to this, the printer 100 executes the print process to print the image IM1 represented by the image data. As above, in this embodiment, the print execution request is sent by using the Wi-Fi connection, which has the faster communication speed than the NFC connection, and thus the printer 100 can be caused to execute the print process promptly.

In S80, the app 28 determines whether or not the print process in the printer 100 succeeded. Specifically, after the print execution request has been sent, the app 28 obtains a notification indicating a result of the print process from the printer 100 through the Wi-Fi I/F 16 and the OS 26. In a case of obtaining a print success notification indicating that the print process succeeded as the notification, the app 28 determines that the print process succeeded (YES in S80). On the other hand, in a case of obtaining a print failure notification indicating that the print process failed as the notification, the app 28 determines that the print process failed (NO in S80). For example, the print process fails if a paper jam occurs during the print process. This print failure notification includes information indicating a cause by which the print process failed.

In the case of determining that the print process failed (NO in S80), the app 28 displays a print failure screen SC6 on the display unit 12 in S82. The print failure screen SC6 includes a message indicating the cause by which the print process failed, a Retry button B6, and a Cancel button.

In S84, the app 28 determines whether or not the Retry button B6 in the print failure screen SC6 is selected by the user. In a case of determining that the Retry button B6 is selected (YES in S84), the app 28 proceeds to S86.

In S86, the app 28 determines whether or not the Wi-Fi connection with the printer 100 is currently established. Specifically, the app 28 supplies an inquiry command including the SSID in the connection information CI to the Wi-Fi I/F 16. In a case where an SSID corresponding to the Wi-Fi connection currently established matches the SSID in the inquiry command, the Wi-Fi I/F 16 supplies a response for the inquiry command to the app 28. In a case of obtaining this response from the Wi-Fi I/F 16, the app 28 determines that the Wi-Fi connection with the printer 100 is currently established. On the other hand, in a case of not obtaining the response from the Wi-Fi I/F 16, the app 28 determines that the Wi-Fi connection with the printer 100 is currently not established.

In the case of determining that the Wi-Fi connection is currently established with the printer 100 (YES in S86), the app 28 returns to S76. Due to this, since the app 28 supplies the printing instruction to the OS 26 again, the print execution request is sent again to the printer 100.

On the other hand, in the case of determining that the Wi-Fi connection is currently not established with the printer 100 (NO in S86), the app 28 proceeds to S40 (see FIG. 3). Due to this, an NFC connection with the printer 100 can be re-established, and further, a Wi-Fi connection with the printer 100 can be re-established.

Further, in a case of determining that the Cancel button in the print failure screen SC6 is selected (NO in S84), the app 28 supplies a Wi-Fi disconnecting instruction to the Wi-Fi I/F 16 through the OS 26 in S88. Due to this, the Wi-Fi connection is disconnected. When S88 is completed, the print request process is terminated.

Figure 5:
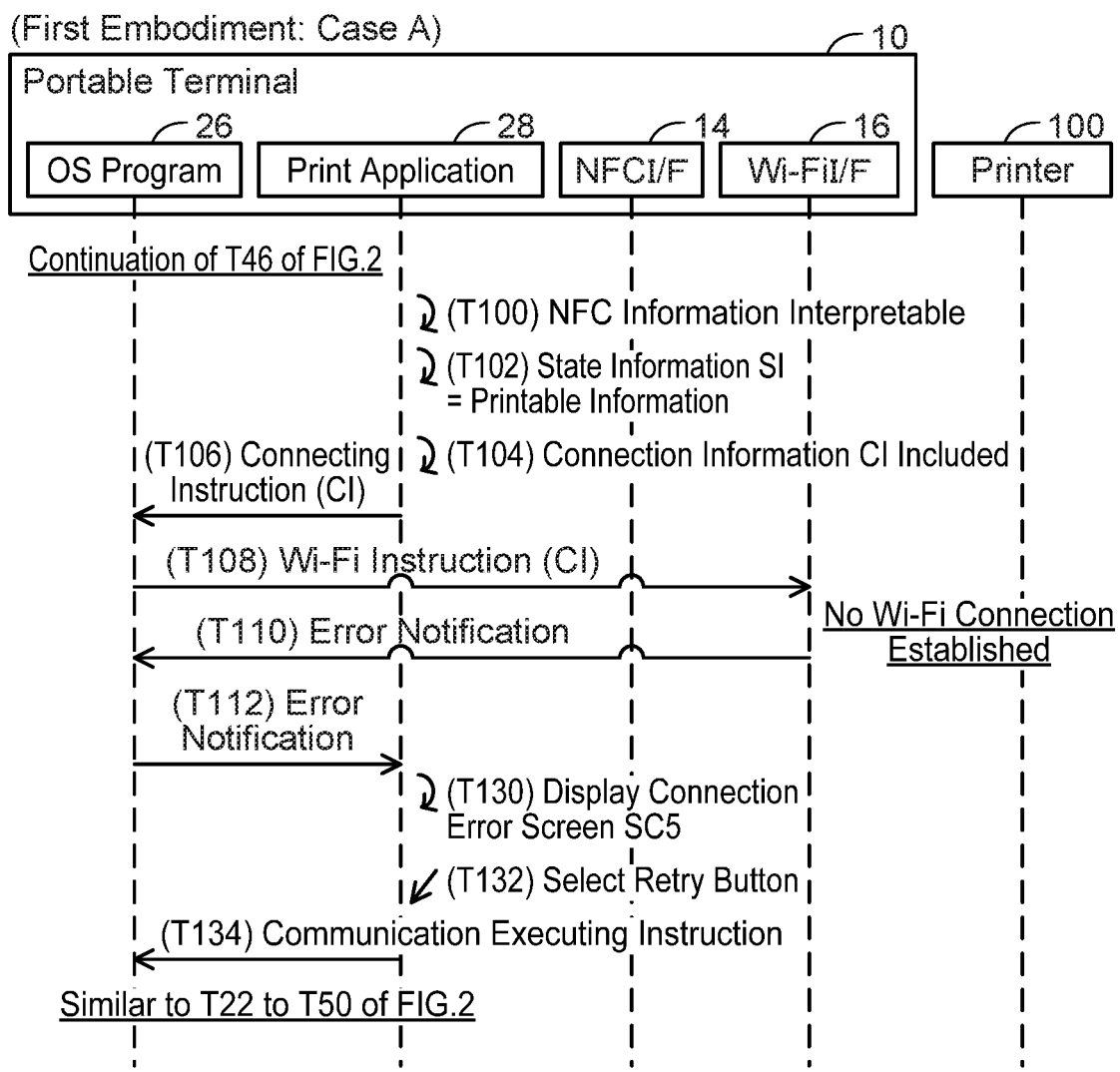
FIG. 5 shows a sequence diagram of Case A in which a Wi-Fi connection is not established.

(Specific Case A; FIG. 5)

A specific case realized by the process of FIGS. 3 and 4 will be described with reference to FIG. 5. Case A of FIG. 5 is a continuation from T46 of FIG. 2, and the power of the printer 100 is turned off during execution of the process of FIGS. 3 and 4.

In T100, the app 28 determines that the NFC information obtained in T46 of FIG. 2 is interpretable (YES in S10 of FIG. 3). In T102, the app 28 determines that the state information SI included in the NFC information is the print-capable information (YES in S20). In T104, the app 28 determines that the NFC information includes the connection information CI (YES in S30). In T106, the app 28 supplies the connecting instruction including the connection information CI to the OS 26 (S64 of FIG. 4).

In T108, the OS 26 supplies the Wi-Fi instruction including the connection information CI to the Wi-Fi I/F 16. In doing so, since the power of the printer 100 is off, a Wi-Fi connection is not established with the printer 100. Due to this, the OS 26 obtains the error notification from the Wi-Fi I/F 16 in T110, and supplies the obtained error notification to the app 28 in T112.

When obtaining the error notification from the OS 26 in T112, the app 28 determines in T130 that the Wi-Fi connection was not established (NO in S70 of FIG. 4), and displays the connection error screen SC5 on the display unit 12 (S72).

In T132, the user turns on the power of the printer 100 and selects the Retry button B5 in the connection error screen SC5 (YES in S74 of FIG. 4). Due to this, the app 28 supplies the communication executing instruction to the OS 26 in T134 (S40 of FIG. 3). As a result, processes similar to T22 to T50 of FIG. 2 are executed, an NFC connection is re-established, and a Wi-Fi connection can be established with the printer 100 by using the connection information obtained by using the re-established NFC connection.

Figure 6:
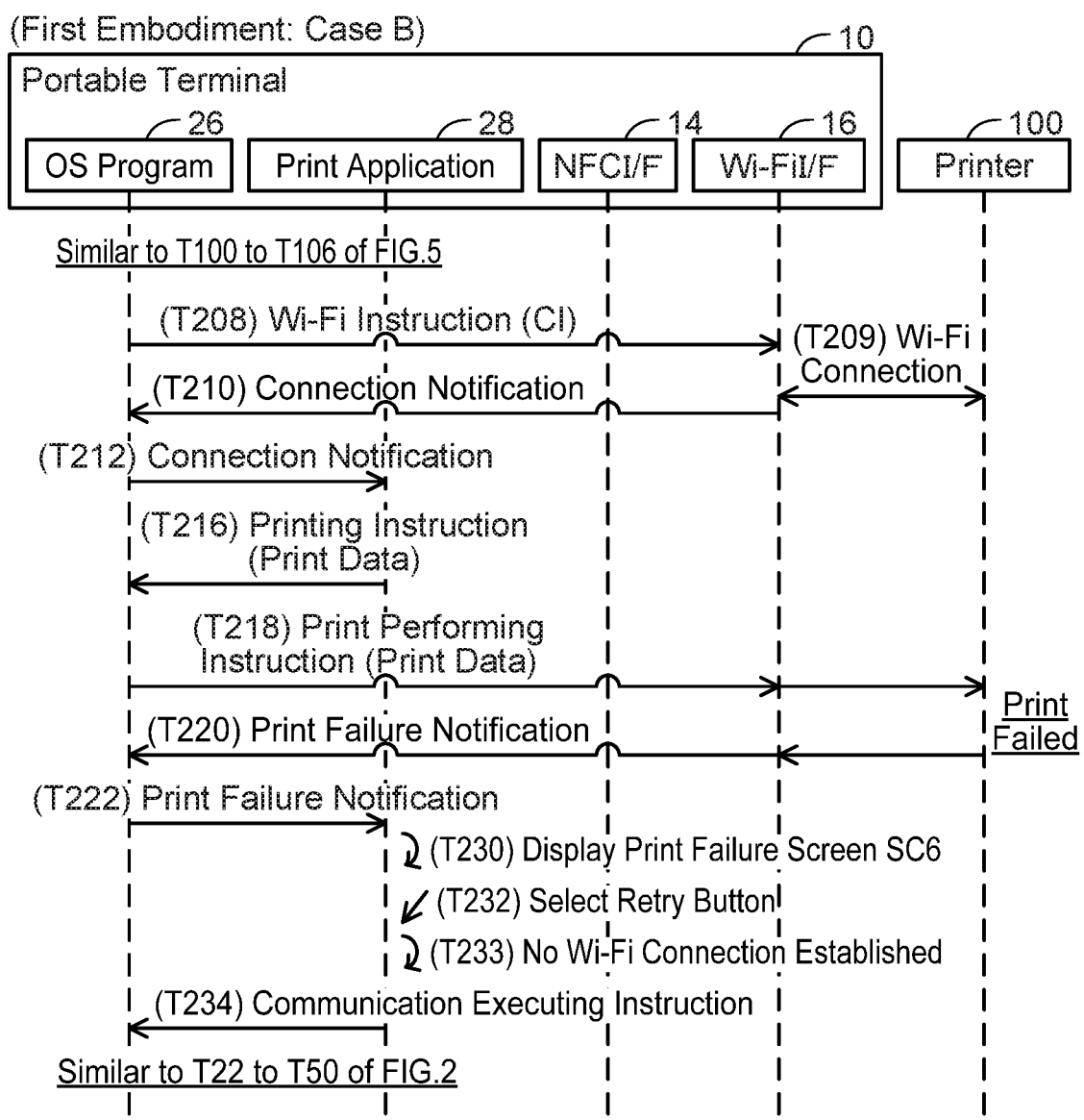
FIG. 6 shows a sequence diagram of Case B in which printing fails.

(Specific Case B; FIG. 6)

Case B of FIG. 6 is a continuation from T46 of FIG. 2, and a paper jam occurs during execution of the print process.

Processes similar to T100 to T106 of FIG. 5 are executed after T46 of FIG. 2. T208 is similar to T108 of FIG. 5. In T209, a Wi-Fi connection is established with the printer 100. In this case, the OS 26 obtains the connection notification from the Wi-Fi I/F 16 in T210, and supplies the obtained connection notification to the app 28 in T212.

When obtaining the connection notification from the OS 26 in T212, the app 28 determines that the Wi-Fi connection has been established (YES in S70 of FIG. 4), and supplies the printing instruction to the OS 26 in T216 (S76).

When obtaining the printing instruction from the app 28 in T216, the OS 26 sends the print execution request including the image data in the printing instruction to the printer 100 via the Wi-Fi I/F 16 by using the Wi-Fi connection in T218. Due to this, the printer 100 starts the print process. However, a paper jam occurs during the print process. In this case, the printer 100 sends the print failure notification to the portable terminal 10.

When receiving the print failure notification from the printer 100 via the Wi-Fi I/F 16 in T220, the OS 26 supplies the received print failure notification to the app 28 in T222. In this case, the app 28 determines that the print process failed (NO in S80 of FIG. 4), and displays the print failure screen SC6 on the display unit 12 in T230 (S82).

In T232, the user selects the Retry button B6 in the print failure screen SC6 (YES in S84 of FIG. 4). In the present case, the Wi-Fi connection is disconnected due to some sort of reason (for example, by the user performing a predetermined operation on the portable terminal 10 to disconnect the Wi-Fi connection). Due to this, the app 28 determines in T233 that the Wi-Fi connection is not currently established with the printer 100 (NO in S86), and supplies the communication executing instruction to the OS 26 in T234 (S40 of FIG. 3). As a result, processes similar to T22 to T50 of FIG. 2 are executed, an NFC connection is re-established, and a Wi-Fi connection can be established with the printer 100 by using the connection information obtained by using the re-established NFC connection.

(Effects of Present Embodiment)

According to the above configuration, in a case where a predetermined condition related to the print process of the printer 100 is not fulfilled, the portable terminal 10 supplies the communication executing instruction to the OS 26 (T60 of FIG. 2 or S40 of FIG. 3) without the selecting instruction of selecting an image in the image selecting screen SC1 and the setting information being inputted by the user. Further, as above, when the communication executing instruction is supplied again to the OS 26, the signal sending instruction is supplied to the NFC I/F 14 (T22 of FIG. 2). As a result, the NFC I/F 14 starts to send the polling signal (T24A), and an NFC connection with the printer 100 can thereby be established (T26). As above, the NFC I/F 14 can establish the NFC connection with the printer 100 without having the user re-input the selecting instruction of selecting the image and the setting information to the portable terminal 10, and thus user's convenience can be improved.

The predetermined condition as above may include: that the NFC information is not received from the printer 100 (NO in T40 of FIG. 2); that the NFC information received from the printer 100 is uninterpretable (NO in S10 of FIG. 3); that the state information SI is the error information (NO in S20); that the NFC information does not include the connection information CI (NO in S30); that the Wi-Fi connection is not established (NO in S70); and that the print process failed (NO in S80), for example. Here, each of NO in T40 of FIG. 2, NO in S10, NO in S20, and NO in S30 of FIG. 3, and NO in S70 can be rephrased as "a case where it is not capable of causing the printer 100 to execute the print process".

(Corresponding Relationships)

The portable terminal 10, the print app 28, and the printer 100 are respectively examples of "terminal device", "computer-readable instructions", and "communication device". The selection of the image in T14 of FIG. 2 is an example of "specific instruction". The NFC I/F 14 and the Wi-Fi I/F 16 are respectively examples of "first wireless interface" and "second wireless interface". The NFC connection and the Wi-Fi connection are respectively examples of "first wireless connection" and "second wireless connection". The print process is an example of "specific process". At least of NO in T40 of FIG. 2, NO in S10, NO in S20, and NO in S30 of FIG. 3, and NO in S70 and NO in S80 of FIG. 4 are examples of "predetermined condition is not fulfilled". The NFC information is an example of "specific information". The print-capable information and the connection information are examples of "predetermined information". The print-capable information is an example of "execution-capable information". The NFC screen SC2 of FIG. 2 is an example of "predetermined screen".

T20 of FIG. 2 is an example of "supplying a communication executing instruction to an OS program in a case where a specific instruction is inputted by a user". T60 of FIG. 2 or S40 of FIG. 3 is an example of "supplying a communication executing instruction to an OS program in a case where it is determined that a predetermined condition is not fulfilled". Further, At least of T40 of FIG. 2, S10, S20, and S30 of FIG. 3, and S70 and S80 of FIG. 4 are examples of "determining whether a predetermined condition is fulfilled".

Second Embodiment

In this embodiment, the connection information CI includes valid duration information EI. The valid duration information EI indicates a valid duration of the connection information CI. For example, a valid time (such as "12:01:00"), which is an end time of the valid duration, is set as the valid duration information EI. The portable terminal 10 can establish a Wi-Fi connection by using the connection information CI only when a current time is before the valid time. Further, in a case where a value "−1" indicating an unlimited duration is set as the valid duration information EI, the portable terminal 10 can establish a Wi-Fi connection by using the connection information CI regardless of the current time.

(Print Request Process; FIG. 4)

A print request process of the present embodiment is similar to that of the first embodiment except that processes of S60 and S62 are added.

In the case of determining that the connection information CI is included in the NFC information (YES in S30 of FIG. 3), the app 28 executes, in S60, a validity determining process for determining whether or not the connection information CI is valid. In S62, the app 28 determines whether or not a determination result of the validity determining process indicates "valid". In a case of determining that the determination result of the validity determining process indicates "valid" (YES in S62), the app 28 proceeds to S64. On the other hand, in a case of determining that the determination result of the validity determining process indicates "invalid" (NO in S62), the app 28 proceeds to S40 of FIG. 3.

Further, the app 28 returns to S60 in the case where the Retry button B5 in the connection error screen SC5 is selected (YES inS74). Further, the app 28 also returns to S60 in the case where the Retry button B6 in the print failure screen SC6 is selected and a Wi-Fi connection is not currently established with the printer 100 (YES in S84, NO in S86).

Figure 7:
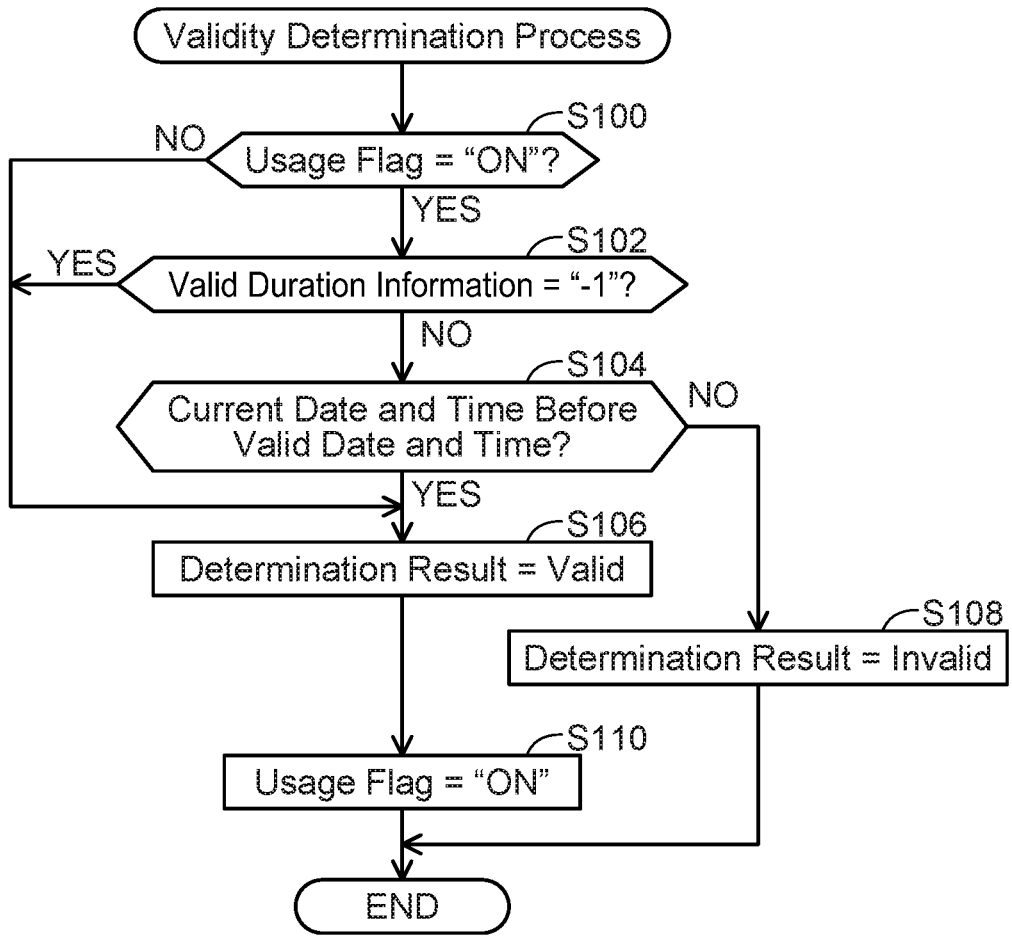
FIG. 7 shows a flowchart of a validity determining process according to a second embodiment.

(Validity Determining Process; FIG. 7)

Next, the validity determining process will be described with reference to FIG. 7. In S100, the app 28 determines whether or not a usage flag is "ON". The usage flag indicates either "ON", which indicates that the connection information CI has been used at least once, or "OFF", which indicates that the connection information CI is to be used for the first time. In a case of determining that the usage flag is "OFF" (NO in S100), the app 28 determines the determination result as "valid" in S106. Further, the app 28 changes the usage flag from "OFF" to "ON" in S110. When S110 is completed, the validity determining process is terminated. The usage flag is changed from "ON" to "OFF" when the print request process is terminated.

In a case of determining that the usage flag is "ON" (YES in S100), the app 28 determines whether or not the valid duration information EI in the connection information CI indicates "−1" in S102. In a case of determining that the valid duration information EI in the connection information CI indicates "−1" (YES in S102), the app 28 determines the determination result as "valid" in S106.

Further, in a case where the valid duration information EI in the connection information CI indicates the valid time (NO in S102), the app 28 determines whether or not the current time is before the valid time indicated by the valid duration information EI in S104. In a case where the current time is before the valid time (YES in S104), the app 28 determines the determination result as "valid" in S106. On the other hand, in a case where the current time is at or after the valid time (NO in S104), the app 28 determines the determination result as "invalid" in S108. When S108 is completed, the validity determining process is terminated.

According to this embodiment, the portable terminal 10 executes the validity determining process for the connection information CI (S60) in the case where a Wi-Fi connection is not established (NO in S70 of FIG. 4) or in the case where the print process fails (NO in S80). Further, the portable terminal 10 supplies the communication executing instruction to the OS 26 (S40 of FIG. 3) in the case where the connection information CI is determined as invalid (NO in S62). Due to this, the NFC I/F 14 can establish an NFC connection with the printer 100, and newly receive valid connection information from the printer 100.

Further, in the case where the connection information CI is determined as valid (YES in S62), the portable terminal 10 supplies the connecting instruction to the OS 26 without supplying the communication executing instruction to the OS 26. Due to this, the portable terminal 10 does not execute the processes for establishing the NFC connection in the case where the current time is within the valid duration, and processing load of the portable terminal 10 can thereby be reduced. Further, as the processes for establishing the NFC connection are not executed, the user does not have to perform the action of bringing the portable terminal 10 close to the printer 100, and thus the user's convenience is improved.

Further, in the case where the valid duration of the connection information CI is unlimited (S102 of FIG. 7), the portable terminal 10 determines that the connection information CI is valid (YES in S62 of FIG. 4) and supplies the connecting instruction to the OS 26. Due to this, similarly to the case where the current time is within the valid duration, the processing load can be reduced, and further the user's convenience is improved. The valid duration information EI is an example of "related information". S60 and S62 of FIG. 4 are examples of "determining whether connection information is valid".

(Variant 1)

"Communication device" is not limited to the printer 100, and may be, for example, a scanner or a multifunction peripheral. In a case where "communication device" is a scanner, a scan process is an example of "specific process". Further, in the case where "communication device" is the scanner, the app 28 may supply the communication executing instruction to the OS 26 in a case where setting information for executing the scan process (such as a document size, a resolution, and a file format) is inputted to the portable terminal 10. As a result, a Wi-Fi connection is established with the printer 100, and a scan execution request for requesting execution of the scan process is sent to the printer 100. In this variant, input of the setting information as above is an example of "specific instruction".

(Variant 2)

In each of the above embodiments, in the case where the selecting instruction of selecting the image IM1 to be printed and the setting information are inputted (T14 of FIG. 2), the processes from T20 and the print request process are executed to cause the printer 100 to execute the print process. Instead of this, the processes from T20 and the processes from S10 of FIG. 3 to S74 of FIG. 4 may be executed to establish a Wi-Fi connection in a case where an establishing instruction for causing the portable terminal 10 and the printer 100 to establish a Wi-Fi connection is inputted by the user. In this variant, the establishment of the Wi-Fi connection and the establishing instruction are respectively examples of "specific process" and "specific instruction". Further, as an alternative to any one of the above embodiments, in a case where a sending instruction for causing the printer 100 to send device information is inputted by the user, the processes from T20 may be executed and the portable terminal 10 may receive the device information from the printer 100 by using the NFC connection in T42. The device information may be, for example, information indicating state information of the printer 100 or a specification of the printer 100. In this variant, sending of the device information and the sending instruction are respectively examples of "specific process" and "specific instruction".

(Variant 3)

In each of the above embodiments, the communication executing instruction is supplied to the OS 26 in the case where the selecting instruction and the setting information for the image IM1 to be printed are inputted (T14 of FIG. 2). Instead of this, the app 28 may supply the communication executing instruction to the OS 26 in a case where a predetermined action, such as shaking the portable terminal 10 left and right for a predetermined number of times, is detected by an acceleration sensor of the portable terminal 10. The predetermined action is an action predefined by the user, and is an action indicating an instruction to cause the portable terminal 10 to execute communication for executing the print process. In this variant, performing the predetermined action on the portable terminal 10 is an example of "specific instruction".

(Variant 4)

In each of the above embodiments, the portable terminal 10 determines in S20 of FIG. 3 whether or not the state information SI included in the NFC information is the print-capable information. Instead of this, the portable terminal 10 may determine whether or not the error information is included in the NFC information. Further, the portable terminal 10 may execute the process of S22 in a case where the error information is included in the NFC information, and may execute the process of S30 in a case where the error information is not included in the NFC information. In this variant, the error information being included in the NFC information is an example of "predetermined condition is not fulfilled".

(Variant 5)

"Specific information does not include connection information" is not limited to that the NFC information does not include an entirety of the connection information CI. For example, the above may include that the NFC information includes a part of the connection information CI (such as, only the SSID), and that the NFC information includes noncompliant connection information (such as connection information including a password that does not fulfill a predetermined number of characters).

(Variant 6)

The Wi-Fi I/F 16 of the portable terminal 10 may support the WFD scheme. In this case, the portable terminal 10 may operate in the CL state of the WFD scheme in S70 of FIG. 4 and may establish a wireless connection according to the WFD scheme with the printer 100. In this case, the connection information CI may include information for identifying the printer 100 (such as a device name, a MAC address). In this variant, the wireless connection according to the WFD scheme is an example of "second wireless connection".

(Variant 7)

In the second embodiment as above, the connection information CI includes the valid duration information EI. Instead of this, the connection information CI may include valid repeating number information. Further, the portable terminal 10 may determine that the connection information is valid when determining that a number of times the process of S64 has been repeated in the validity determining process is within a valid repeating number indicated by the valid repeating number information. In this variant, the determination on whether or not the number of times S64 has been repeated is within the valid repeating number is an example of "determining whether connection information is valid".

(Variant 8)

In the second embodiment as above, the valid duration information EI indicates the end time of the valid duration. Instead of this, the valid duration information EI may indicate the valid duration itself (such as "120 seconds"). Further, the portable terminal 10 may determine that the connection information is valid in a case of determining that an elapsed time from when the NFC information including the connection information CI was received from the printer 100 until present is within the valid duration in S104 of FIG. 7. In this variant, the valid duration is an example of "related information".

(Variant 9)

At least one of the processes of T40 of FIG. 2, S10, S20, S30 of FIG. 3, and S70, S80 of FIG. 4 may be executed. Generally speaking, "predetermined condition is not fulfilled" includes at least one of determining NO in T40 of FIG. 2, NO in S10, NO in S20, NO in S30 of FIG. 3, and NO in S70, No in S80 of FIG. 4.

(Variant 10)

In the second embodiment as above, the connection information CI may not include the valid duration information EI and the process of S104 of FIG. 7 may not be executed. In this variant, "related information" may not be received.

(Variant 11)

The process of S102 of FIG. 7 may not be executed. In this variant, "related information" may not be information indicating the unlimited duration.

(Variant 12)

The process of T30 of FIG. 2 may not be executed. In this variant, "predetermined screen" may not be displayed.

(Variant 13)

"First wireless interface" may not be an I/F for executing NFC communication, and may be an I/F for executing wireless communication according to another communication scheme such as Bluetooth (registered trademark), infrared, or TransferJet. Further, "second wireless interface" may not be an I/F for executing wireless communication according to the Wi-Fi scheme, and may be, for example, an I/F for executing wireless communication according to another communication scheme such as Bluetooth.

(Variant 14)

In each of the above embodiments, the respective processes of FIGS. 2 to 7 are executed by the CPU 22 of the portable terminal 10 executing the print scan application 28 and the like (that is, software). Instead of this, one or more of the processes may be implemented by hardware such as logic circuits.

What is claimed is:

1. A non-transitory computer-readable medium storing computer-readable instructions for a terminal device,
   the computer-readable instructions, when executed by a processor of the terminal device, causing the terminal device to:
   in a case where a specific instruction for causing the terminal device to communicate with a communication device is inputted by a user, supply a communication executing instruction to an operating system (OS) program of the terminal device, the communication executing instruction being for instructing to execute communication via a first wireless interface of the terminal device,
      wherein the OS program supplies a signal sending instruction to the first wireless interface in response to obtaining the communication executing instruction,
      the first wireless interface starts sending a polling signal in response to obtaining the signal sending instruction, establishes a first wireless connection with the communication device in response to the polling signal being received by the communication device and stops sending the polling signal after establishing the first wireless connection with the communication device, and
      the first wireless connection is for causing the communication device to execute a specific process;
   after the first wireless connection via the first wireless interface has been established with the communication device by the first wireless interface sending the polling signal, determine whether a predetermined condition related to the specific process is fulfilled; and
   in a case where it is determined that the predetermined condition is not fulfilled, supply the communication executing instruction to the OS program without the specific instruction being re-inputted by the user so as to cause the first wireless interface to restart sending the polling signal, wherein in a case where it is determined that the predetermined condition is fulfilled, the communication executing instruction is not supplied to the OS program.

2. The non-transitory computer-readable medium as in claim 1, wherein
   it is determined that the predetermined condition is fulfilled in a case where the terminal device is capable of causing the communication device to execute the specific process, and
   it is determined that the predetermined condition is not fulfilled in a case where the terminal device is not capable of causing the communication device to execute the specific process.

3. The non-transitory computer-readable medium as in claim 1, wherein
   it is determined that the predetermined condition is fulfilled in a case where specific information is received from the communication device via the first wireless interface by using the first wireless connection, and
   it is determined that the predetermined condition is not fulfilled in a case where the specific information is not received from the communication device.

4. The non-transitory computer-readable medium as in claim 1, wherein
   the computer-readable instructions, when executed by the processor of the terminal device, further cause the terminal device to:
   receive specific information from the communication device via the first wireless interface by using the first wireless connection,
   wherein it is determined that the predetermined condition is fulfilled in a case where the specific information is interpretable, and
   it is determined that the predetermined condition is not fulfilled in a case where the specific information is uninterpretable.

5. The non-transitory computer-readable medium as in claim 1, wherein
   the computer-readable instructions, when executed by the processor of the terminal device, further cause the terminal device to:
   receive specific information from the communication device via the first wireless interface by using the first wireless connection,
   wherein it is determined that the predetermined condition is fulfilled in a case where the specific information includes predetermined information, and
   it is determined that the predetermined condition is not fulfilled in a case where the specific information does not include the predetermined information.

6. The non-transitory computer-readable medium as in claim 5, wherein
   the predetermined information is execution-capable information indicating that the communication device is currently capable of executing the specific process,
   it is determined that the predetermined condition is fulfilled in the case where the specific information includes the predetermined information which is the execution-capable information, and
   it is determined that the predetermined condition is not fulfilled in a case where the specific information does not include the predetermined information which is the execution-capable information and the specific information includes error information indicating that the communication device is currently incapable of executing the specific process.

7. The non-transitory computer-readable medium as in claim 5, wherein
the predetermined information is connection information for establishing a second wireless connection with the communication device via a second wireless interface of the terminal device, the second wireless interface being different from the first wireless interface,
it is determined that the predetermined condition is fulfilled in the case where the specific information includes the predetermined information which is the connection information, and
it is determined that the predetermined condition is not fulfilled in the case where the specific information does not include the predetermined information which is the connection information.

8. The non-transitory computer-readable medium as in claim 7, wherein
the first wireless interface is configured to execute a wireless communication according to a Near Field Communication (NFC) scheme, and
the second wireless interface is configured to execute a wireless communication according to a Wi-Fi scheme.

9. The non-transitory computer-readable medium as in claim 1, wherein
the computer-readable instructions, when executed by the processor of the terminal device, further cause the terminal device to:
receive connection information from the communication device via the first wireless interface by using the first wireless connection, the connection information being for establishing a second wireless connection with the communication device via a second wireless interface of the terminal device, the second wireless interface being different from the first wireless interface; and
supply the connection information to the OS program,
wherein it is determined that the predetermined condition is fulfilled in a case where the second wireless connection via the second wireless interface is established with the communication device after the connection information has been supplied to the OS program, and
it is determined that the predetermined condition is not fulfilled in a case where the second wireless connection via the second wireless interface is not established with the communication device after the connection information has been supplied to the OS program.

10. The non-transitory computer-readable medium as in claim 9, wherein
the computer-readable instructions, when executed by the processor of the terminal device, further cause the terminal device to:
in a case where it is determined that the predetermined condition is not fulfilled due to the second wireless connection being not established with the communication device, determine whether the connection information is valid,
wherein in a case where it is determined that the predetermined condition is not fulfilled due to the second wireless connection being not established with the communication device and it is determined that the connection information is not valid, the communication executing instruction is supplied to the OS program, and
in a case where it is determined that the predetermined condition is not fulfilled due to the second wireless connection being not established with the communication device and it is determined that the connection information is valid, the communication executing instruction is not supplied to the OS program.

11. The non-transitory computer-readable medium as in claim 10, wherein
the computer-readable instructions, when executed by the processor of the terminal device, further cause the terminal device to:
receive related information together with the connection information from the communication device via the first wireless interface by using the first wireless connection, the related information being related to a valid duration of the connection information,
wherein it is determined whether the connection information is valid by determining whether a current time is included in the valid duration by using the relation information.

12. The non-transitory computer-readable medium as in claim 11, wherein
it is determined that the connection information is valid in a case where the related information indicates an unlimited duration.

13. The non-transitory computer-readable medium as in claim 9, wherein
the first wireless interface is configured to execute a wireless communication according to a Near Field Communication (NFC) scheme, and
the second wireless interface is configured to execute a wireless communication according to a Wi-Fi scheme.

14. The non-transitory computer-readable medium as in claim 1, wherein
it is determined that the predetermined condition is fulfilled in a case where the communication device succeeds in executing the specific process, and
it is determined that the predetermined condition is not fulfilled in a case where the communication device fails to execute the specific process.

15. The non-transitory computer-readable medium as in claim 1, wherein
the OS program causes a display unit of the terminal device to display a predetermined screen in response to obtaining the communication executing instruction, the predetermined screen indicating that the communication via the first wireless interface is executable, and
the polling signal is sent while the predetermined screen is displayed on the display unit.

16. A terminal device comprising:
a first wireless interface;
a processor; and
a memory storing computer-readable instructions therein, the computer-readable instructions, when executed by the processor, causing the terminal device to:
in a case where a specific instruction for causing the terminal device to communicate with a communication device is inputted by a user, supply a communication executing instruction to an operating system (OS) program of the terminal device, the communication executing instruction being for instructing to execute communication via the first wireless interface,
wherein the OS program supplies a signal sending instruction to the first wireless interface in response to obtaining the communication executing instruction,
the first wireless interface starts sending a polling signal in response to obtaining the signal sending instruction, establishes a first wireless connection with the communication device in response to the polling signal being received by the communicadevice and stops sending the polling signal after establishing the first wireless connection with the communication device, and the first wireless connection is a wireless connection for causing the communication device to execute a specific process;

after the first wireless connection via the first wireless interface has been established with the communication device by the first wireless interface sending the polling signal, determine whether a predetermined condition related to the specific process is fulfilled; and in a case where it is determined that the predetermined condition is not fulfilled, supply the communication executing instruction to the OS program without the specific instruction being re-inputted by the user so as to cause the first wireless interface to restart sending the polling signal, wherein in a case where it is determined that the predetermined condition is fulfilled, the communication executing instruction is not supplied to the OS program.

* * * * *